April 5, 1927.

H. RITTER

FOOD PRESERVING JAR

Filed Oct. 20, 1923

1,623,754

Inventor:
Heinrich Ritter
by
Attorney.

Patented Apr. 5, 1927.

1,623,754

UNITED STATES PATENT OFFICE.

HEINRICH RITTER, OF ESSLINGEN, GERMANY, ASSIGNOR TO THE FIRM DR. FINCKH APPARATE-GESELLSCHAFT M. B. H., OF STUTTGART, GERMANY.

FOOD-PRESERVING JAR.

Application filed October 20, 1923, Serial No. 669,759, and in Switzerland August 21, 1922.

My invention relates to food preserving jars, more especially for the preservation of fruit juices, mashed or stewed fruits, jam or the like. It is an object of my invention to provide a jar the contents of which can be removed in parts without spoiling the remainder.

In the drawings affixed to this specification and forming part thereof a food preserving jar embodying my invention is illustrated diagrammatically by way of example. In the drawings—

Figure 1:
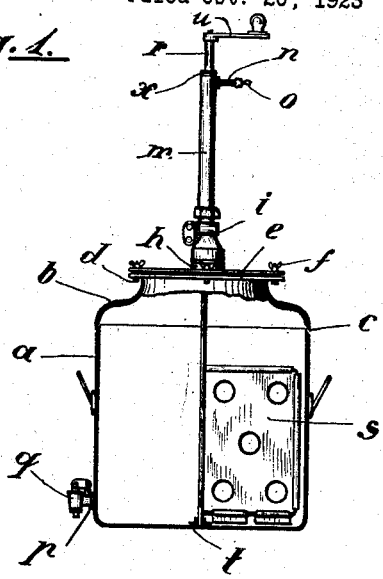
Figure 1 is an elevation, partly in vertical section.

Referring to the drawing, the body $a$ of the jar, and the neck portion $b$ are united at $c$ by welding. The part $b$ is provided with a flange $b^1$ through which extend threaded bolts $d$ provided with winged nuts $f$ by means of which the cover $e$ may be secured in place, a packing ring $g$ being arranged between the rim or flange $e^1$ of the cover $e$ and the rim or flange $b^1$ of the neck $b$.

The central part of the cover $e$ is raised and so shaped as to form a threaded projection $h$ onto which is screwed an air inlet cock $i$ which is preferably arranged to be sealed. A tube $k$ filled with sterilized wadding or the like is mounted in the upper end of the cock $i$, and a threaded branch pipe $n$ extending laterally from the tube $m$ is provided at its end with a check valve $o$ of the kind used in connection with bicycle tires.

A branch tube $p$ is provided near the bottom of the jar and a tap cock $q$ is screwed onto this branch, this cock being also preferably arranged to be sealed.

The material to be preserved, for instance, a liquid, such as milk, fruit-juice, mashed fruit or the like, is introduced into the receptacle after the nuts $f$ have been unscrewed and the cover $e$ has been removed. The cover is then mounted in place on the receptacle and is air-tightly closed with the aid of the bolts $d$ and the nuts $f$. If necessary, the contents of the receptacle are heated prior to closing the receptacle, so as to expel the air.

If the contents of the receptacle are liquid, they may be tapped off at once through the tap cock, provided that the air cock $i$ and valve $o$ be opened or the filter tube $m$ with its branch $n$ be previously removed.

If, however, the matter contained in the receptacle $a$ is thick or pulpy, the tube $m$ with its branch $n$ is attached to the cover and compressed air is forced into the receptacle through the wadding, whereby the mashed or stewed fruit or the like can be forced out in parts, the cocks $i$ and $q$ being open. The quantity of the mashed or stewed fruit or the like forced out through the cock $q$ depends upon and corresponds to the amount of compressed air introduced through the valve $o$.

Figure 2:
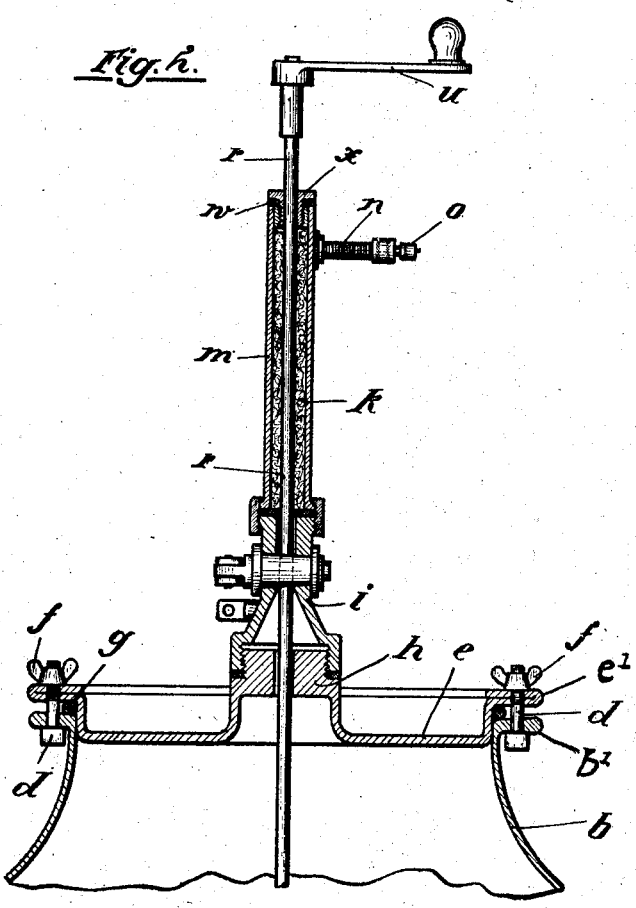
Figure 2 is an axial section, drawn to a larger scale, of the upper portion of the jar and its accessories.

The device above described can be used also for forcing even pulpy matter such as apple sauce through the cock $q$. Such pulpy materials, however, have a tendency of separating out the solid matter contained therein so that part of it will remain in the jar. In order to obviate this drawback, I have devised the stirring device illustrated in Figures 1 and 2 which consists in a shaft $r$ extending through the tube $m$ and the bore of the plug of the cock $i$, and provided at its top with a hand crank $u$ and supported at its foot by a thrust bearing $t$. The shaft $r$ can be easily removed from the tube $m$, and is provided with at least one stirring blade $s$, the size of which is such that it moves when being rotated nearly through the entire section of the receptacle.

Figure 3:
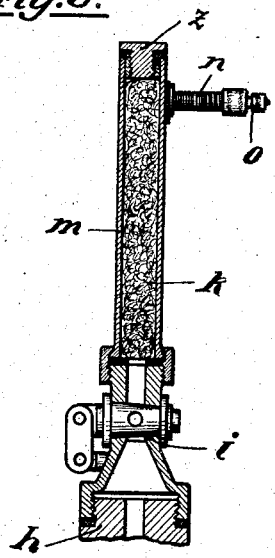
Figure 3 is a similar view of a modification.

The wadding serves in this case for packing the shaft $r$. At the upper end of the tube $m$ is a sleeve $x$ which is exteriorly threaded and below the flange of which is arranged an asbestos ring $w$. The sleeve consists preferably of brass or the like. If the apparatus is to be used without the stirring device, the shaft $r$ with its crank and the stirring blade are removed therefrom. The threaded sleeve $x$ is removed also and replaced by a threaded plug $z$, (Fig. 3).

If the content of the receptacle $a$ is stirred at certain intervals, its homogenity is restored, and it flows off not only from the center part of the receptacle, but also from the walls.

An important feature consists in the absence of any danger of germ-containing air getting access to the interior of the receptacle and spoiling its contents.

I wish it to be understood that I do not desire to be limited to the exact details of construction shown and described, for obvious modifications will occur to a person skilled in the art.

I claim:—

1. Preserving jar comprising a perforated cover, a stop cock in the perforation of said cover, an air filter on said cover above and in communication with said cock, and a stirring device removably inserted in said filter and extending through said cock into the jar.

2. Preserving jar comprising a perforated cover, a stop cock in the perforation of said cover, an air filter on said cover above and in communication with said cock, a stirring device removably inserted in said filter and extending through said cock into the jar and discharging means associated with the jar.

In testimony whereof I affix my signature.

HEINRICH RITTER.